United States Patent
Solis et al.

(10) Patent No.: US 8,331,346 B2
(45) Date of Patent: Dec. 11, 2012

(54) DISTRIBUTED CONTEXT-AWARE SCHEDULED ACCESS IN A NETWORK

(75) Inventors: Ignacio Solis, Redwood City, CA (US); Jose J. Garcia Luna-Aceves, San Mateo, CA (US); Marc Mosko, Santa Cruz, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 928 days.

(21) Appl. No.: 11/644,663

(22) Filed: Dec. 21, 2006

(65) Prior Publication Data

US 2008/0151820 A1 Jun. 26, 2008

(51) Int. Cl.
*H04J 3/24* (2006.01)
*H04W 4/00* (2009.01)
*H04L 12/28* (2006.01)
*H04W 72/00* (2009.01)

(52) U.S. Cl. ........ 370/349; 370/328; 370/389; 455/450; 455/464; 455/509

(58) Field of Classification Search .................. 370/348, 370/349, 229, 230, 235, 237, 310, 328, 329, 370/389; 455/450, 464, 509
See application file for complete search history.

(56) References Cited

U.S. PATENT DOCUMENTS

| | | | | |
|---|---|---|---|---|
| 6,651,106 B1 * | 11/2003 | Driscoll | ........................ | 709/243 |
| 6,747,976 B1 | 6/2004 | Bensaou | ........................ | 370/395 |
| 6,788,702 B1 * | 9/2004 | Garcia-Luna-Aceves et al. | ........................ | 370/458 |
| 6,791,997 B2 | 9/2004 | Beyer | ........................ | 370/447 |
| 6,963,549 B1 | 11/2005 | Jayaraman | ........................ | 370/328 |
| 2003/0067892 A1 * | 4/2003 | Beyer et al. | ........................ | 370/328 |
| 2005/0036505 A1 * | 2/2005 | Frei et al. | ........................ | 370/442 |
| 2006/0146874 A1 * | 7/2006 | Yuan et al. | ........................ | 370/468 |
| 2008/0095102 A1 * | 4/2008 | Meng et al. | ........................ | 370/329 |

OTHER PUBLICATIONS

Chakraborty, Goutam, Genetic Algorithm to Solve Optimum TDMA Transmission Schedule in Broadcast Packet Radio Networks, IEEE Transactions on Communications, vol. 52, No. 5, May 2004, pp. 765-777.*

Bao et al., A New Approach to Channel Access Scheduling for Ad Hoc Networks, Proc. ACM Seventh Annual International Conference on Mobile Computing and Networking, Rome, Italy, Jul. 16-21, 2001.*

Fullmer Chane et al., Solutions to Hidden Terminal Problems in Wireless Networks, Computer Engineering Department, School of Engineering, University of California, Santa Cruz, CA, 1997 ACM 0-89791-905-X/97/0009, pp. 39-49.

(Continued)

*Primary Examiner* — George Eng
*Assistant Examiner* — Jing Gao
(74) *Attorney, Agent, or Firm* — Shun Yao; Park, Vaughan, Fleming & Dowler LLP (57) ABSTRACT

A communication system includes devices configured to communicate with each other through a temporal sequence of frames. Each of these frames includes multiple sub-channels and network-context information associated with communication between the devices. For example, network-context information associated with a data packet transmitted by a first device using a first sub-channel during a first frame is included in the first sub-channel. Furthermore, a second device, which communicates with the first device and a third device, arbitrates potential conflicts between the first device and the third device over use of the first sub-channel by providing feedback information to the first device. This feedback information is determined based on the network-context information in multiple frames, which is accumulated by the second device.

23 Claims, 4 Drawing Sheets

OTHER PUBLICATIONS

Publication: I. Chlamtac, A. Farago, and H. Zhang, *Time-spread Multiple-access (TSMA) Protocols for Multihop Mobile Radio Networks*, IEEE/ACM Transactions on Networking, 6(5):804-12, Dec. 1997.

Publication: I. Cidon and M. Sidi, *Distributed Assignment Algorithms for Multihop Packet Radio Networks*, IEEE Transactions on Computers, 38(10):1353-61, Oct. 1989.

Publication: A. Ephremides and T. Truong, *Scheduling Broadcasts in Multihop Radio Networks*, IEEE Transactions on Communications, 38(4):456-60, Apr. 1990.

Publication: S. Even, O. Goldreich, S. Moran, and P. Tong, *On the NP-completeness of Certain Network Testing Problems*, Networks, 14(1):1 {24, Mar. 1984.

Publication: J. Ju and V. Li, *An Optimal Topology-transparent Scheduling Method in Multihop Packet Radio Networks*, IEEE/ACM Transactions on Networking, 6(3):298-306, Jun. 1998.

Publication: R. Krishnan and J. Sterbenz, *An Evaluation of the TSMA Protocol as a Control Channel Mechanism in MMWN*, Technical report, BBN Technical Memorandum No. 1279, 2000.

Publication: R. Ramanathan, *A Unified Framework and Algorithm for Channel Assignment in Wireless Networks*, Wireless Networks, 5(2):81 {94, 1999.

Publication: R. Ramaswami and K. Parhi, *Distributed Scheduling of Broadcasts in a Radio Network*, In Proceedings of IEEE Conference on Computer Communications (INFOCOM), vol. 2, pp. 497-504, Ottawa, Ont., Canada, Apr. 23-27, 1989, IEEE Comput. Soc. Press.

Publication: L. Bao and J. Garcia-Luna-Aceves, *A New Approach to Channel Access Scheduling for Ad Hoc Networks*, Proc. ACM Seventh Annual International Conference on Mobile Computing and Networking, Rome, Italy, Jul. 16-21, 2001.

Publication: L. Bao and J.J. Garcia-Luna-Aceves, *Hybrid Channel Access Scheduling in Ad Hoc Networks*, Proc. IEEE ICNP 02: 10th IEEE International Conference on Network Protocols, Paris, France, Nov. 12-15, 2002.

Publication: L. Bao and J.J. Garcia-Luna-Aceves, *Transmission Scheduling in Ad Hoc Networks with Directional Antennas*, Proc. ACM MobiCom 2002{ Eight Annual International Conference on Mobile Computing and Networking, Sep. 23-28, 2002, Atlanta, GA.

Publication: C. Rentel and T. Kunz, *Reed-Solomon and Hermitian Code-based Scheduling Protocols for Wireless Ad Hoc Networks*, Proc. AdHocNow 2005, Cancun, Mexico, Oct. 6-8, 2005.

Publication: R. Rozovsky and P.R. Kumar, *SEEDEX: A MAC Protocol for Ad Hoc Networks*, Proc. ACM MobiHoc 2001, Long Beach, CA, 2001.

Publication: C. Zhu and M. Corson, *A Five phase Reservation Protocol (FPRP) for Mobile Ad Hoc Networks*, In Proceedings of IEEE Conference on Computer Communications (INFOCOM), vol. 1, pp. 322-331, San Francisco, CA, USA, Mar. 29-Apr. 2, 1998.

Publication: Z. Tang and J.J. Garcia-Luna-Aceves, *A Protocol for Topology Dependent Transmission Scheduling*, in Proc. IEEE Wireless Communications and Networking Conference 1999 (WCNC 99), Sep. 1999.

\* cited by examiner

DISTRIBUTED CONTEXT-AWARE SCHEDULED ACCESS IN A NETWORK

BACKGROUND

1. Field of the Invention

The present invention relates to techniques for accessing channels in networks. More specifically, the present invention relates to dynamic channel-access protocols.

2. Related Art

Recent advances in networking technology have made it possible to support multiple voice-related applications, such as mobile smart phones and Voice over Wireless Internet Protocol (VoWIP), on individual networks. In the near future, these applications may be running on mobile stations concurrently with legacy data-centric applications. To support such integrated voice/data traffic in a network, the channel-access protocol (such as the Medium-Access-Control protocol) in these systems needs to provide high channel utilization and bounded channel-access delay. The former is important for data-centric applications, and the latter is critical for providing uninterrupted data delivery in voice-related (i.e., real-time) applications.

Contention-based channel-access schemes have previously been developed for multiple-hop ad-hoc networks and for wireless local area networks or LANs. However, these existing approaches are unable to provide high channel utilization as network load increases. In addition, ad-hoc networks that utilize such conventional channel-access schemes are vulnerable to collisions, which can potentially starve certain stations by preventing them from acquiring the channel. As a consequence, the existing contention-based approaches are unable to ensure an upper bound on the channel-access delay. This makes it impossible to run soft real-time applications, and even bulk transfer applications, over these networks at high loads.

'Contention-free' schemes have been proposed to overcome these limitations, thereby providing conflict-free channel access independently of the radio connectivity around any given device or node in the communication system. These contention-free schemes may be classified as 'topology independent' or 'topology dependent.' In topology-independent channel-access schemes, deterministic transmission schedules are produced that allow nodes or devices in an ad-hoc network to periodically access the communication channel without collision and also ensure a bounded channel-access delay. For example, a device may be pre-assigned one or more unique sub-channels (such as time slots) in a global schedule. However, these contention-free schemes typically require an excessive amount of control-signaling overhead and global knowledge of the network, and typically also suffer from channel under-utilization.

In contrast, topology-dependent channel-access schemes use local topology information to produce the transmission schedules. These schemes may be used to construct schedules for small groups of devices, thereby solving the under-utilization problem at high loads while only using small-area topological knowledge. For example, dynamic (randomized) channel-access schemes use probabilistic transmission schedules in which each device always has a certain probability to access the channel during a given sub-channel.

Unfortunately, while such techniques incur less control overhead than the earlier contention-free channel-access protocols, they still do not ensure a bound on channel-access delay. In particular, as the number of devices competing for sub-channels increases in the communication system, the probability of any given device winning an election for a sub-channel goes down.

Hence, what is needed is a method and an apparatus that facilitates channel-access in networks without the problems listed above.

SUMMARY

One embodiment of this invention provides a communication system that includes devices configured to communicate with each other through a temporal sequence of frames. Each of these frames includes multiple sub-channels and network-context information associated with communication between the devices. For example, network-context information associated with a data packet transmitted by a first device using a first sub-channel during a first frame is included in the first sub-channel. Furthermore, a second device, which communicates with the first device and a third device, arbitrates potential conflicts between the first device and the third device over use of the first sub-channel by providing feedback information to the first device. This feedback information is determined based on the network-context information in multiple frames, which is accumulated by the second device.

In some embodiments, the first device communicates with the second device directly or indirectly via a fourth device.

In some embodiments, the feedback information indicates an absence of a conflict. Furthermore, in some embodiments the feedback information indicates a presence of a conflict, thereby instructing the first device to cease transmitting using the first sub-channel.

In some embodiments, the feedback information is provided in another sub-channel in the current frame and/or in another sub-channel in a subsequent frame.

In some embodiments, the network-context information includes a reservation by the first device for the first sub-channel. This reservation may be valid for two or more frames. Furthermore, in some embodiments the first device dynamically determines which of the sub-channels to reserve based on usage probabilities for the sub-channels in multiple frames and/or based on a ranking of a permutation of sub-channel identifiers.

In some embodiments a global parameter in the communication system specifies a number of sub-channels in the current frame that may be reserved by the devices.

In some embodiments, the accumulated network-context information includes a time ordering of reservations for sub-channels and identification information for the corresponding devices.

In some embodiments, the network-context information is included in a second sub-channel during a subsequent frame.

In some embodiments, the sub-channels correspond to time slots, frequency bands, spread-spectrum codes, and/or to directional antennas that transmit and receive the frames.

In some embodiments, communication between the devices is synchronized using a clock signal. For example, the clock signal may include a global positioning system signal. However, in some embodiments communication between the devices is self-synchronized.

Another embodiment provides a communication device for use in the communication system.

Another embodiment provides a method including operations corresponding to the functions in the above-described communication system.

BRIEF DESCRIPTION OF THE FIGURES

Table 1 provides exemplary pseudo-code for an election technique in accordance with an embodiment of the present invention.

Table 2 provides exemplary pseudo-code for a reservation technique in accordance with an embodiment of the present invention.

Table 3 provides exemplary pseudo-code for a reservation-check technique in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a communication system, a method, and devices for use with the communication system are described. Communication between the devices in the communication system may be enabled by the method. In particular, nodes or devices (henceforth referred to as devices) in the communication system may communicate by exchanging a temporal sequence of frames, each of which includes multiple sub-channels. In the communication system, a channel-access protocol (henceforth referred to as Context-Aware Scheduled Access or CASA) is used to determine a transmission schedule for the shared communication channel. This schedule is calculated in a distributed manner (i.e., a decentralized manner), eliminates contention between devices, and allows reservations.

In CASA, devices share their view of the network neighborhood with their neighbors, including both a list of the devices that they communicate with and the reservations that they are aware of. For example, the network-context information may include two-hop or three-hop topological maps. However, in some embodiments this network-state context information also includes anything that affects channel access, including the maximum number of reservations available to the devices and when reservations may be released.

Using this context information, each device then calculates the same view of the network, including a transmission schedule, and reservations are made dynamically based on data traffic. In particular, during this process CASA combines distributed fair elections (i.e., all devices receive a fair share of the available bandwidth) with a reservation mechanism that provides channel-access time guarantees to those devices that succeeding in accessing the channel and must persist in using the same reserved sub-channels. In addition, the devices eliminate any reservation conflicts that have occurred, for example, due to stale network-state context information and/or device mobility. The resulting optimized schedule and reservations provide a bounded channel-access time and high channel throughput, thereby allowing real-time data flows to reach their destinations within end-to-end delivery deadlines.

The method, devices, and/or communication system associated with the present invention may be utilized in a wide variety of network applications, including LANs (such as WiFi, WiMax, and/or a LAN that utilizes a communication protocol that is compatible with an IEEE 802 standard), wide area networks or WANs, metropolitan area networks or MANs, and/or cellular telephone networks (such as the Global System for Mobile communication or GSM). In addition, the method and/or communication system may include fixed and/or mobile stations, devices or nodes, and the network may utilize fixed cells, may include an extended access-point network, and/or may be a random or ad-hoc network. In some embodiments, the method, devices, and/or communication system may involve or include communication protocols such as time division multiple access or TDMA, frequency division multiple access or FDMA, code division multiple access or CDMA, and/or a spatial diversity technique. In an exemplary embodiment, CASA provides a conflict free channel-access protocol in a multi-hop ad-hoc network.

Note that in the discussion that follows the term 'election' refers to a technique for assigning sub-channels to multiple competing devices in the communication system, and the term 'reservation' refers to a technique in which a device that has won a sub-channel in an election communicates to other devices in the communication system that it intends to use the sub-channel for one, two, or more frames. Furthermore, a 'scheduling technique' may include an election technique and/or a reservation technique.

Figure 1:
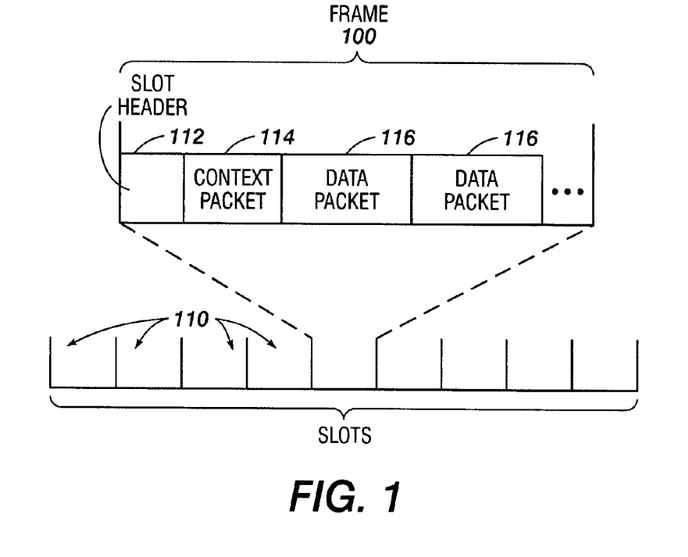
FIG. 1 is a block diagram illustrating a frame for use in a communication system in accordance with an embodiment of the present invention.

We now discuss embodiments of CASA. FIG. 1 presents a block diagram illustrating a frame 100 for use in a communication system in accordance with an embodiment of the present invention. This frame includes multiple sub-channels in the form of time slots 110 (which are used as an illustrative example of a type of sub-channel). Each time slot may include a slot header 112 (including an identifier for the transmitting device and the total amount of data), a context packet 114, and/or one or more data packets 116 (which each contain a packet header and a payload). Note that context information includes information about the internal state of the devices, the state of the network (the number of devices, data traffic flows, etc.), and the state of the environment around devices in a neighborhood in the network. Also note that all of the devices in the communication system listen during all time slots. Therefore, a single time slot may contain data packets 116 directed to different or multiple receivers.

Figure 2:
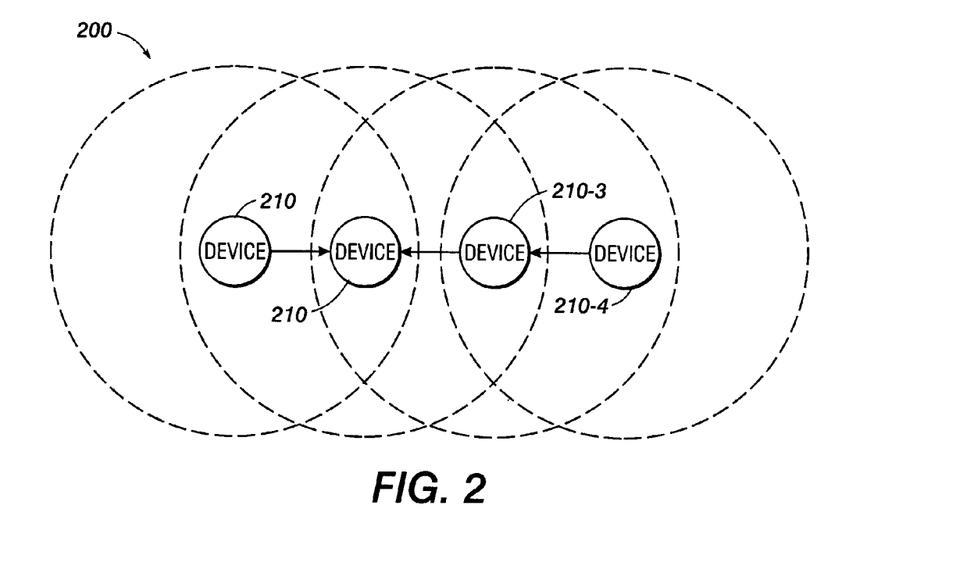
FIG. 2 is a block diagram illustrating a communication system in accordance with an embodiment of the present invention.

As shown in FIG. 2, which presents a block diagram illustrating a communication system 200 in accordance with an embodiment of the present invention, frames, such as frame 100 (FIG. 1), are communicated between devices 210 in the communication system 200. Each of these devices may also communicate with a subset of the communication system 200. For example, a given device, such as device 210-4, may communicate with neighboring devices in a one-hop, two-hop, or three-hop neighborhood (i.e., these devices communicate via 0, 1, or 2 intermediary devices).

Note that the given device may interfere with another device, such as device 210-3, if that device is within transmission range. Furthermore, devices 210 may compete with one another for access to a shared communication channel. Therefore, these devices may reserve time slots 110 (FIG. 1) using CASA, and a given device may determine which, if any, of the available time slots 110 (FIG. 1) to reserve or to release based on a dynamic scheduling technique.

Based on the reservations, only one device will transmit per time slot in a contending neighborhood. This will ensure that neighbors of a given device, i.e., the possible recipients, will not get interference from their neighbors. To achieve this, devices need to maintain current context information about their neighborhood, i.e., the devices benefit from knowledge about the local environment in which they operate. Note that CASA allows sub-channels to be reserved without collapsing under load, and also utilizes the channel fully. Furthermore, if a device has no information to send it may choose not to participate in the election process. However, if a device has specific traffic demand, it can choose to reserve certain time slots in future frames. This drastically reduces the uncertainty in the transmission schedule for the device and, thus, reduces the jitter seen by applications, such as VoWIP.

Note that in some embodiments frame 100 (FIG. 1) and/or communication system 200 (FIG. 2) include fewer or additional components, two or more components are combined into a single component, and/or a position of one or more components may be changed. For example, the number of frames per second that are communicated depends on timing and hardware. For example, a frame could be anywhere from 100 to 500 ms depending on how well the hardware keeps clocks synchronized between devices. Thus, the number of data packets 116 (FIG. 1) in frame 100 (FIG. 1) may vary in different implementations.

We now discuss the election technique in more detail. The channel-access protocol deals with the very local phenomenon of access to the channel. To optimize this, most of the context information that is needed is local. For a given device, this context information includes a list of neighboring devices with which the given device will need to coordinate when transmissions take place. Furthermore, in wireless embodiments where transmissions can interfere with other devices (which are currently unknown or hidden), information about the contending neighborhood is also needed. This neighborhood information is shared with devices in the neighborhood of the given device (and vice versa). In this way, the given device is aware of its neighbor's neighbors.

A context-aware device (henceforth referred to as a CASA device) sends its context information at least once every frame in the form of a context packet (such as context packet 114 in FIG. 1). If a device wins an election and has no data to send, it will probabilistically send a context packet. Furthermore, if data is being sent using a time slot and there is free space at the end of this time slot, a context packet may be appended. In an exemplary embodiment, a context packet consists of a neighbor list of up to 20 devices and 5 reservations and has a size of at most 250 bytes. Devices send context information by iterating over the neighbor and reservations list. Note that in some embodiments, at the beginning of every time slot header (such as slot header 112 in FIG. 1), there is also a mini context. This may include information about one neighbor and one reservation.

As discussed previously, the election and/or scheduling process uses the neighbor information. For example, a list of unique neighbor device identifiers may be hashed with the time slot number. Furthermore, the time slots may be uniquely numbered based on synchronization information, such as time in a Global Positioning System or based on self-synchronization information. This will give each device a specific result for each time slot. Note that the device with the highest result is considered the winner of the election. If there is a tie in the results, the device identifier, which is unique, may be used to determine the winner. Furthermore, every device performs this calculation for each one of its contending neighbors and itself.

Because results for a given device are calculated by all devices that are aware of the given device, all of its two-hop neighbors will calculate the same result for this device. If the context is up to date, this will ensure that no two devices sharing a neighbor will win the election simultaneously. For example, if two devices share a neighbor, this neighbor would have informed each device of the existence of the other device, i.e., the devices would have known the other existed. Therefore, the devices would have calculated an election result for the other and would have compared values, which will yield only one winner.

If the given device has a certain traffic demand it wants to meet, it will want to reserve time slots. When the device wins a time slot, it can choose to reserve it. This will attempt to guarantee that the time slot will be assigned to this device for all future frames (until the device releases it). (In general, frames may be elected or reserved, i.e., held for the next frame or multiple frames.) Then, the given device will include a reservation note in the context information, specifying that it wishes to reserve this time slot. Furthermore, the given device will consider the time slot reserved unless some other device reports a conflict. In addition, any further transmissions using this time slot will be tagged as reserved, so that devices listening know the time slot is not electable. Note that once the given device has won one or more elections, and has transmitted using the maximum number of sub-channels that it needs in a frame, it will be ignored in future sub-channel elections in that frame.

When a device receives a reservation from a contending (one-hop or two-hop) neighbor, it will record it to be sent out using a future context packet. Note that if a device receives a reservation from a device that is not a contending neighbor, it will record the reservation but will not re-broadcast it. When this occurs, the receiving device may conclude that the last hop that rebroadcast the reservation will not be participating in the election of the time slot in question and hence can be removed from future elections for that time slot.

In the communication system, conflicting reservations may be resolved in a distributive manner using a mini-election technique. For example, the devices may determine a hash of the reserved time-slot number and the competing-device identifiers, and the device with the highest hash value may keep the time-slot reservation. Future context broadcasts can inform the losing device about the competing reservation. This loosing device will perform the same calculation and realize it cannot have that time slot.

In some embodiments, devices are mobile. This means that schedules will need to adapt as the network topology changes. Furthermore, the schedule, reservations, and neighbor lists will need to be refreshed periodically. Note that one of the conflicts that will need to be resolved as devices move are reservations. For example, a device may move to an area where some of its reserved time slots conflict with another device's reservations. Under typical mobility conditions, this conflict may be resolved slowly, because the incoming device will not be a direct neighbor of the contender, i.e., at first the conflicting devices will share a neighbor. This new mutual neighbor will detect the conflict and inform the conflicting devices that there is a problem. Then, the distributed conflict resolution technique will resolve which devices keep which time slots.

Note that to maintain a fair environment devices may be limited to a maximum number of reservations individually, i.e., at any given time, only a certain percentage of the time slots in a frame may be reserved. Therefore, devices will not try to reserve time slots if that puts them over their individual reservation limit.

Furthermore, if the context information is not up to date, collisions may occur. As a consequence, the network will need to make sure that the devices have current information. One possible cause of stale state information is that a device has moved into an area and other devices in that area have not yet updated their neighbor list. Note that when a collision is detected nothing special happens. Devices will merely find out if they weren't supposed to transmit in a specific time slot based on the context updates they are receiving. In some embodiments, CASA incorporates a scalable mechanism for collision reporting. For example, devices may report the last time slot where a collision was detected.

When a new device joins the network, it will first spend a frame listening for traffic. This will give the new device partial topology and state information about the scheduling context. With this information, it can calculate elections for the next frame. Then, the new device will try to transmit using a time slot where it won the election. This may create a collision because the new device may only have partial topology information, but once one of the neighbors hears its transmission it will add the new device to the list of devices, effectively adding the new device to the schedule. Next, the list will be shared and soon all devices will know of the new device's existence and participation.

Note that if the new devices does not detect anything in the frame it listened to, it may operate in a bootstrapping mode. In this mode, the new device will start transmitting the context in every time slot with an increasing probability. When it finally detects a neighbor, the new device will wait for an initialization time (for example, 2 seconds) for more devices to join before it transmits data.

We now describe exemplary embodiments of election and reservation techniques that may be used in CASA. Table 1 provides exemplary pseudo-code for an election technique for a device N at time t in accordance with an embodiment of the present invention. In this technique, time t is a structured variable in the form (t.frame, t.slot), where t.frame identifies the frame over all time and t.slot is a cyclical counter for each time-slot number $\{0 \ldots k\}$ in a frame. Note that hash function hash (i, t) computes the election hash for device identifier i and time t, considering both the frame and time-slot structure of t.

TABLE 1

```
Election(N, t)
  maxv = 0;
  elected = φ;
  if N.reserved[t.slot] ≠ 0;
    elected = N.reserved[t.slot];
  else;
    for each i ∈ N.contend;
      if i ∉ N.excluded[t.slot];
        v = hash(i, t);
        if elected = φ;
          maxv = v;
          elected = i;
        else if v = maxv and i > elected;
          elected = i;
        else if v > maxv;
          maxv = v;
          elected = i;
  return elected;
```

Furthermore, set N.contend is the set of devices in the contention region for device N. This set contains the device N and all one-hop and two-hop neighbors contending for time slots. Array N.reserved[s] stores the device identifier of the reservation owner for a particular time slot s, which is known at device N. This array may be an empty set or a singleton. Furthermore, array N.excluded[s] includes a set of device identifiers that device N believes should not be eligible to contend for time slot s. Note that the maintenance of N.excluded[s] and N.reserved[s] are described below.

In the election for time t, each device N checks to see if it believes time slot t.slot is reserved. If this is the case, the device holding the reservation wins the election. However, if the time slot is not reserved, device N iterates over all contending devices N.content, excluding devices in the set N.excluded [t.slot]. For each contending device i included in this iteration, the value v is its election value for time t, as computed using the election hash function. Note that the election technique tracks the device identifier elected with the largest value of v. Furthermore, ties are broken using device-identifier ordering. Then, the election technique returns the device identifier that wins the time slot or NULL ($\phi$) if no device is elected.

Note that each device maintains the array N.reserved[ ] for each cyclic time slot value $\{0 \ldots k\}$. In an exemplary embodiment, k=99. Note that when a device is initialized, it sets $\forall i \in \{0 \ldots k\}$ N.reserved[i]=$\phi$.

Table 2 provides exemplary pseudo-code for a reservation technique for a device N in accordance with an embodiment of the present invention. This technique is executed when device N receives a reservation R (or generates it locally) and has processed topology information in the same context as R (thereby ensuring that the reservation-owner topology is up to date). Note that reservation R is the tuple {owner, time slot, time, last hop}, where R.owner is the device claiming cyclical time slot R.slot, R.time is the time (t.frame, t.slot) at which owner R.owner claimed time slot R.slot, and R.lasthop is the device broadcasting time slot R.slot in its context.

TABLE 2

```
Book Reservation(N, R)
  if N.owner ∉ N.contend;
    N.excluded[R.slot] = N.excluded[R.slot] ∪ R.lasthop;
  else if N.reserved[R.slot] = φ;
    N.reserved[R.slot] = R.owner;
    N.ResExpire[R.slot] = R.time + RESTIME;
    N.excluded[R.slot] = R.lasthop;
  else if N.reserved[R.slot] = R.owner;
    N.ResExpire[R.slot] = R.time + RESTIME;
    N.excluded[R.slot] = N.excluded[R.slot] ∪ R.lasthop;
  else;
    v1 = hash(N.reserved[R.slot], R:slot);
    v2 = hash(R.owner, R.slot);
    if v2 > v1 or (v2 = v1 and R:owner > N.reserved[R.slot]);
      N.reserved[R.slot] = R.owner;
      N.ResExpire[R.slot] = R.time + RESTIME;
      N.excluded[R.slot] = R.lasthop;
```

Furthermore, in this technique a device maintains three data structures, N.reserved[ ], N.excluded[ ], and N.ResExpire[ ]. N.ResExpire[ ] tracks the soft state of the reservation for time slot s, because the reservation must be updated at least every RESTIME time units, otherwise the reservation will expire. If the reservation owner is not in the contender set for device N, for example, if owner R.owner is a three-hop neighbor, then device N can exclude device R.lasthop from elections for time slot R.slot without reserving time slot R.slot. Because device R.lasthop is aware of the reservation for time slot R.slot, it will not contend for this time slot.

Furthermore, because owner R.owner is not in the contender set R.contend, device N does not need to grant (or deny) the reservation.

If a time slot is not reserved and the reservation owner is a contending device, device N sets owner R.owner as the reservation holder and updates the expiration time. Then, device N excludes device R.lasthop from all elections for time slot R.slot because device R.lasthop, which has the same reservation as device N, will not contend for the time slot. However, if a time slot is already reserved and the reservation is for the same owner R.owner, device N adds device R.lasthop to the exclusion set for time slot R.slot and updates the soft state for N.ResExpire[ ].

If the reservation R conflicts with an existing reservation, the device N conducts a mini-election between the conflicting devices and chooses one to own the time slot. In some embodiments, this mini-election is based only on the time of time slot R.slot and not on a full-frame time. This is because the election may be frame independent. Note that if the new reservation R wins the mini-election, device N updates its soft state and resets the exclusion set R.exclude to be the new last hop.

At the end of every frame, each device N executes a soft-state reservation check. Table 3 provides exemplary pseudo-code for a reservation-check technique in accordance with an embodiment of the present invention. Note that if a reservation expired in the previous frame, the soft state is cleared.

TABLE 3

Maintenance(N, t)
for s = 0 to k;
  if N.ResExpire[s] < t;
    N.reserved[s] = $\phi$;
    N.excluded[s] = $\phi$;

While the preceding discussion has used one-hop and two-hop neighborhoods as an illustration, in other embodiments the contention neighborhood may include additional hops. For example, in some embodiments the contention neighborhood includes three or more hops.

The performance of CASA was evaluated theoretically using a Qualnet simulator (from Scalable Network Technologies, Inc., in Los Angeles, Calif.) for a network with 36 devices and the same Physical layer as in IEEE 802.11b. In these simulations, CASA did not differentiate the different types of data traffic, i.e., all traffic was treated equally. Transmission Control Protocol (TCP), Constant Bit Rate (CBR), and Voice Over Internet Protocol (VoIP) were used as illustrative data traffic examples. Furthermore, the time slot size was 1 ms, time slots per frame was 100, and time slot maximum transmission unit (MTU) was 1000 bytes. In addition, the maximum number of reservable time slots per device was 50, the interference neighborhood included 3 hops, neighbor expiration was 500 ms, reservation expiration was 300 ms, and network initialization was 2 s. Note that the simulations were performed 10 times with different random seeds, which includes location for random-topology experiments.

Results indicate that CASA provides high channel utilization and a low average delay (for example, 11 ms to cross four hops) over a wide range of data flows, including different data rates and data-packet sizes. As expected, CASA performed well at high loads, such as 20 kbps flows across TCP sessions or CBR traffic. In addition, CASA performed well in cross-traffic data flows, thereby allowing multiple data flows to cooperate and share the channel.

Figure 3:
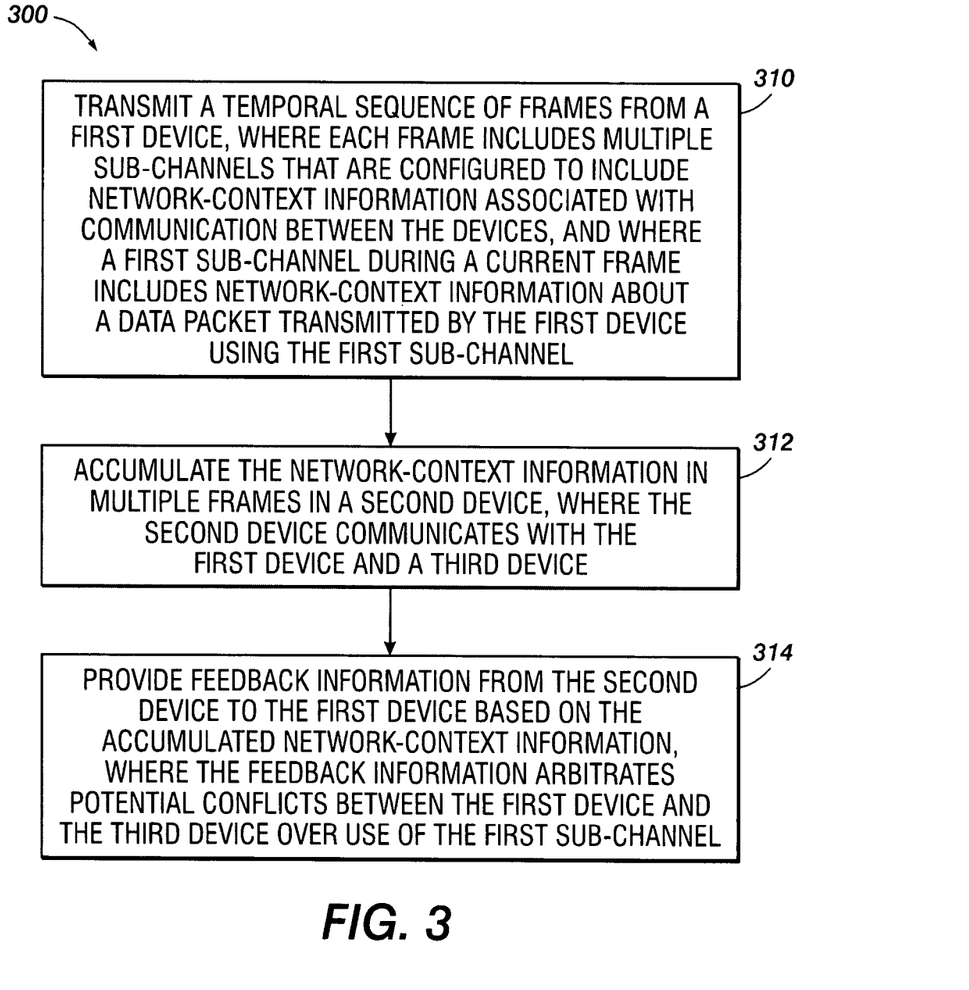
FIG. 3 is a flow chart illustrating communication between devices in accordance with an embodiment of the present invention.

We now describe embodiments of a process for communicating between devices. FIG. 3 provides a flow chart illustrating a process 300 for communication between devices in accordance with an embodiment of the present invention. During this process, a first device transmits a temporal sequence of frames (310). Each frame includes multiple sub-channels that are configured to include network-context information associated with communication between the devices. In addition, a first sub-channel during a current frame includes network-context information about a data packet transmitted by the first device using the first sub-channel. Next, a second device accumulates the network-context information in multiple frames (312). Note that the second device communicates with the first device and a third device. Then, the second device provides feedback information to the first device based on the accumulated network-context information (314). This feedback information arbitrates potential conflicts between the first device and the third device over use of the first sub-channel.

Note that in some embodiments there may be additional or fewer operations, the order of the operations may be changed, and two or more operations may be combined into a single operation.

Figure 4:
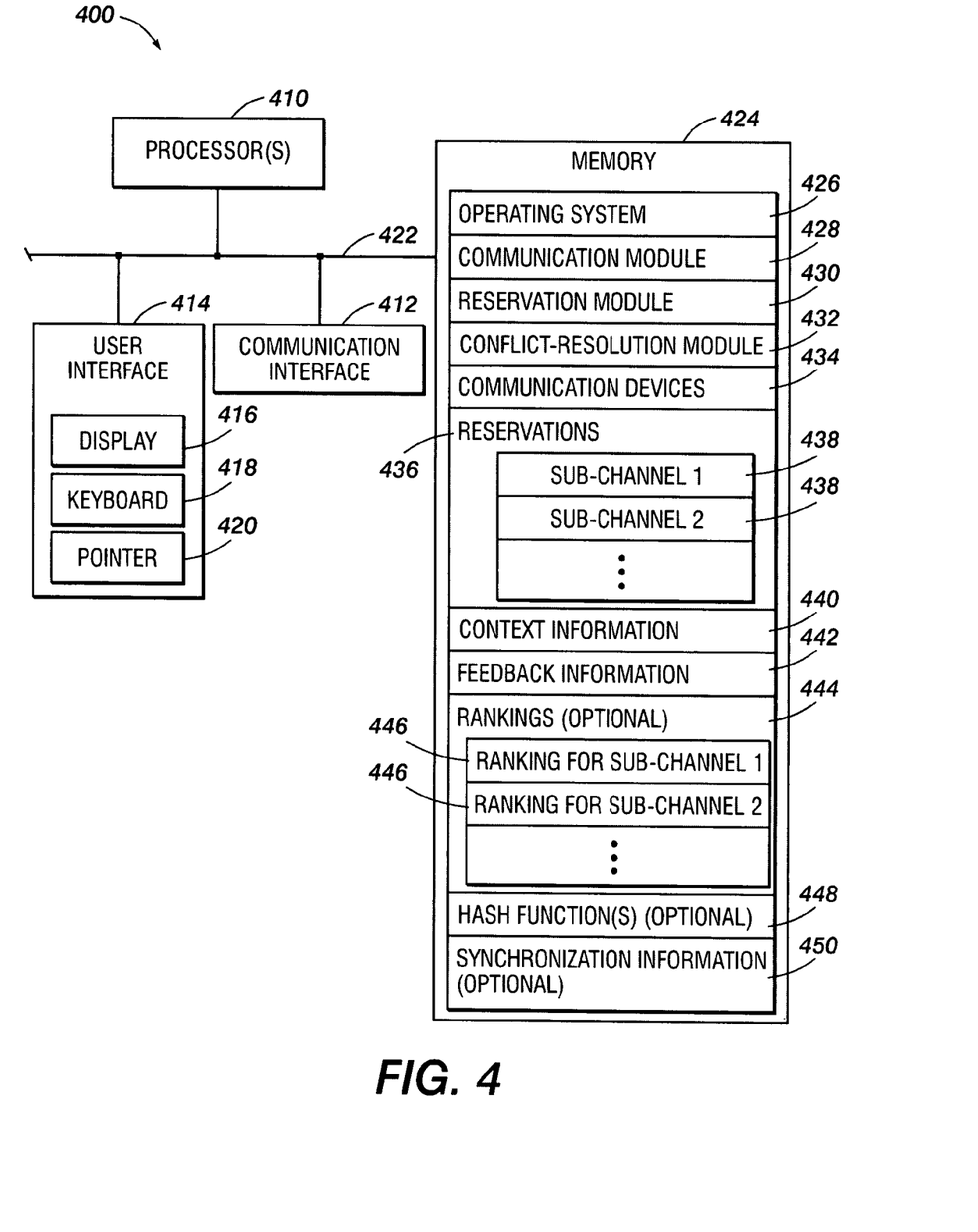
FIG. 4 is a block diagram illustrating a device in accordance with an embodiment of the present invention.

We now described devices for use in the communication system. FIG. 4 is a block diagram illustrating a device 400 in accordance with an embodiment of the present invention. Device 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include a display 416, a keyboard 418, and/or a pointer 420, such as a mouse.

Memory 424 in the device 400 may include volatile memory and/or non-volatile memory. More specifically, memory 424 may include ROM, RAM, EPROM, EEPROM, FLASH, one or more smart cards, one or more magnetic disc storage devices, and/or one or more optical storage devices. Memory 424 may store an operating system 426 that includes procedures (or a set of instructions) for handling various basic system services for performing hardware dependent tasks. In some embodiments, the operating system 426 is a real-time operating system. The memory 424 may also store procedures (or a set of instructions) in a communication module 428. The communication procedures may be used for communicating with one or more computers, devices and/or servers, including computers, devices and/or servers that are remotely located with respect to the device 400.

Memory 424 may also include multiple program modules (or a set of instructions), including reservation module 430 (or a set of instructions) and conflict-resolution module 432 (or a set of instructions). Furthermore, memory 424 may include a list of communication devices 434 in the N-hop neighborhood of the device 400, reservations 436 for sub-channels 438, and/or one or more optional rankings 444 (including rankings for different sub-channels 446). The one or more rankings 444 may be determined using one or more optional hash functions 448 and/or one or more optional pseudo-random sequences (not shown). In addition, memory 424 may include context information 440, feedback information 442, and/or optional synchronization information 450.

Instructions in the various modules in memory 424 may be implemented in a high-level procedural language, an object-oriented programming language, and/or in an assembly or machine language. The programming language may be compiled or interpreted, i.e, configurable or configured to be executed by the one or more processing units 410.

Although device 400 is illustrated as having a number of discrete items, FIG. 4 is intended to be a functional description of the various features that may be present in device 400 rather than as a structural schematic of the embodiments described herein. In practice, and as recognized by those of ordinary skill in the art, the functions of the device 400 may be distributed over a large number of servers or computers, with various groups of the servers or computers performing particular subsets of the functions. In some embodiments, some or all of the functionality of device 400 may be implemented in one or more ASICs and/or one or more digital signal processors DSPs.

Device 400 may include fewer components or additional components, two or more components may be combined into a single component, and/or a position of one or more components may be changed. In some embodiments the functionality of device 400 may be implemented more in hardware and less in software, or less in hardware and more in software, as is known in the art.

Figure 5:
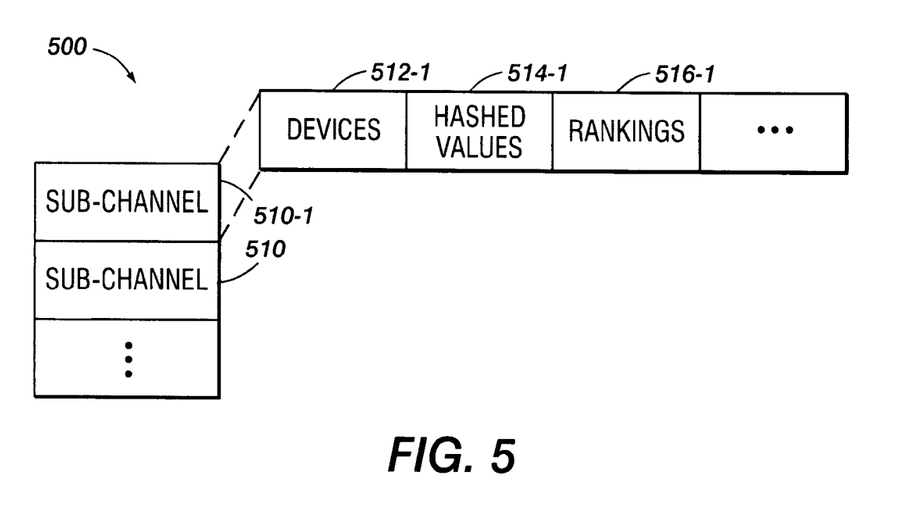
FIG. 5 is a block diagram illustrating a data structure in accordance with an embodiment of the present invention.

We now discuss data structures that may be used in device 400. FIG. 5 is a block diagram illustrating a data structure 500 in accordance with an embodiment of the present invention. This data structure may contain rankings for sub-channels 510. Each sub-channel, such as sub-channel 510-1, may include devices 512-1, hashed values 514-1, and rankings 516-1.

Figure 6:
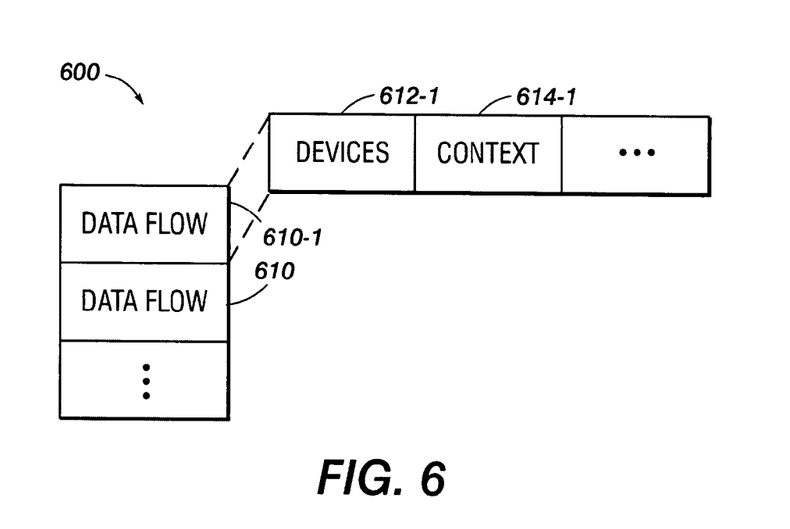
FIG. 6 is a block diagram illustrating a data structure in accordance with an embodiment of the present invention.

FIG. 6 is a block diagram illustrating a data structure 600 in accordance with an embodiment of the present invention. This data structure may include context information for data flows 610. Each data flow, such as data flow 610-1, may include a devices 612-1, and context information 614-1. Note that that in some embodiments of the data structure 500 and/or the data structure 600 there may be fewer or additional components, two or more components may be combined into a single component, and/or a position of one or more components is changed.

In some embodiments, the CASA architecture may be further optimized across network and transport layers, for example, using context-aware routing and transport protocols. This may further improve scheduling behavior, and may allow utility tradeoffs between data traffic flows. For example, CASA may generate topology events for the routing and higher layers in the network architecture. Furthermore, it may detect when devices enter and leave transmission range. Therefore, CASA may determine if a packet is going to a next hop that is unreachable. In this case, certain devices that come in and/or out of range (for example, due to mobility or noisy links) may be tagged as unreliable and communication to them may be blocked until the communication link becomes stable. Note that these devices may still be counted during elections because they can still cause interference.

In some embodiments, CASA is extended to include reservation release optimization, reservations in the future, dynamic reservation caps, neighborhood reservation caps, optimizing for devices that do not want or cannot participate in the schedule, and/or optimizing of header exchanges. Furthermore, in other embodiments, CASA includes mobility optimizations and/or data priorities.

Note that while CASA has been described using several dynamic election or scheduling techniques, other techniques, such as cyclical, random or pseudo-random permutation, may be used to determine which devices win which sub-channels. For example, in some embodiments a given device in the communication system dynamically determines which of the sub-channels to reserve based on usage probabilities for the sub-channels that are accumulated in multiple frames and/or based on a ranking of a permutation of sub-channel identifiers for competing devices.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A communication system, comprising:
a first device and a second device configured to communicate with each other via a network through a temporal sequence of frames,
 wherein the first device and the second device share a mutual neighbor in the network;
 wherein each frame which encapsulates a data packet transmitted from the first device includes multiple sub-channels, which are configured to include network-context information that indicates the first device's view of its network neighbors and comprises a list of devices that the first device communicates with and reservations that the first device is aware of;
 wherein each sub-channel additionally includes in a time slot header mini context information about one neighbor and one reservation that is extracted from the network-context information; and
 wherein the network-context information associated with a data packet transmitted by the first device using a first sub-channel during a first frame is included in the first sub-channel; and
an arbitration device, which communicates with the first device and the second device, configured to arbitrate potential conflicts between the first and second devices over the use of the first sub-channel by providing feedback information to the first device, wherein the feedback information is determined based on the network-context information in multiple frames which is accumulated by the arbitration device from at least the second device.

2. The communication system of claim 1, wherein the first device communicates with the arbitration device directly.

3. The communication system of claim 1, wherein the first device communicates with the arbitration device indirectly via a third device.

4. The communication system of claim 1, wherein the feedback information indicates an absence of a conflict.

5. The communication system of claim 1, wherein the feedback information indicates a presence of a conflict, thereby instructing the first device to cease transmitting using the first sub-channel.

6. The communication system of claim 1, wherein the network-context information includes a reservation by the first device for the first sub-channel.

7. The communication system of claim 6, wherein the reservation is valid for two or more frames.

8. The communication system of claim 6, wherein the first device dynamically determines which of the sub-channels to reserve based on usage probabilities for the sub-channels in multiple frames.

9. The communication system of claim 6, wherein the first device dynamically determines which of the sub-channels to reserve based on a ranking of a permutation of sub-channel identifiers.

10. The communication system of claim 1, wherein a global parameter in the communication system specifies a number of sub-channels in the current frame that may be reserved by the devices.

11. The communication system of claim 1, wherein the feedback information is provided in another sub-channel in the current frame.

12. The communication system of claim 1, wherein the feedback information is provided in another sub-channel in a subsequent frame.

13. The communication system of claim 1, wherein the accumulated network-context information includes a time ordering of reservations for sub-channels and identification information for the corresponding devices.

14. The communication system of claim 1, wherein the network-context information is included in a second sub-channel during a subsequent frame.

15. The communication system of claim 1, wherein the sub-channels correspond to time slots.

16. The communication system of claim 1, wherein the sub-channels correspond to frequency bands.

17. The communication system of claim 1, wherein the sub-channels correspond to spread-spectrum codes.

18. The communication system of claim 1, wherein the sub-channels correspond to directional antennas that transmit and receive the frames.

19. The communication system of claim 1, wherein communication between the devices is synchronized using a clock signal.

20. The communication system of claim 19, wherein the clock signal includes a global positioning system signal.

21. The communication system of claim 1, wherein communication between the devices is self-synchronized.

22. A communication device, comprising:
a transceiver configured to communicate with other devices via a network through a temporal sequence of frames,
wherein each frame which encapsulates a data packet transmitted from the communication device includes multiple sub-channels, which are configured to include network-context information that indicates the communication device's view of its network neighbors and comprises a list of devices that the communication device communicates with and reservations that the communication device is aware of;
wherein each sub-channel additionally includes in a time slot header mini context information about one neighbor and one reservation that is extracted from the network-context information; and
wherein the network-context information associated with a data packet transmitted by the communication device using a first sub-channel during a first frame is included in the first sub-channel;
wherein the communication device is configured to receive feedback information from an arbitration device regarding use of the first sub-channel, wherein the feedback information is determined based on the network context information accumulated in multiple frames by the arbitration device from a second device that shares a mutual neighbor with the communication device in the network, and if the feedback information indicates that there is a conflict with the second device over use of the sub-channel, the communication device is configured to cease transmitting using the first sub-channel;
wherein the communication device is configured to accumulate the network-context information in multiple frames; and
wherein the communication device is configured to provide feedback information to the other devices about potential conflicts over use of other sub-channels based on the accumulated network-context information.

23. A method for communicating between devices, comprising:
transmitting, from a first device, a temporal sequence of frames over a network,
wherein each frame which encapsulates a data packet transmitted from the first device includes multiple sub-channels, which are configured to include network-context information that indicates the first device's view of its network neighbors and comprises a list of devices that the first device communicates with and reservations that the first device is aware of;
wherein each sub-channel additionally includes in a time slot header mini context information about one neighbor and one reservation that is extracted from the network-context information; and
wherein a first sub-channel during a current frame includes network-context information about a data packet transmitted by the first device using the first sub-channel;
accumulating, at an arbitration device, the network-context information in multiple frames from the first device and from a second device, wherein the first and second devices share a mutual neighbor in the network, wherein the arbitration device communicates with the first device and the second device; and
providing feedback information from the arbitration device to the first device based on the accumulated network-context information, wherein the feedback information arbitrates potential conflicts between the first device and the second device over use of the first sub-channel.

* * * * *